UNITED STATES PATENT OFFICE.

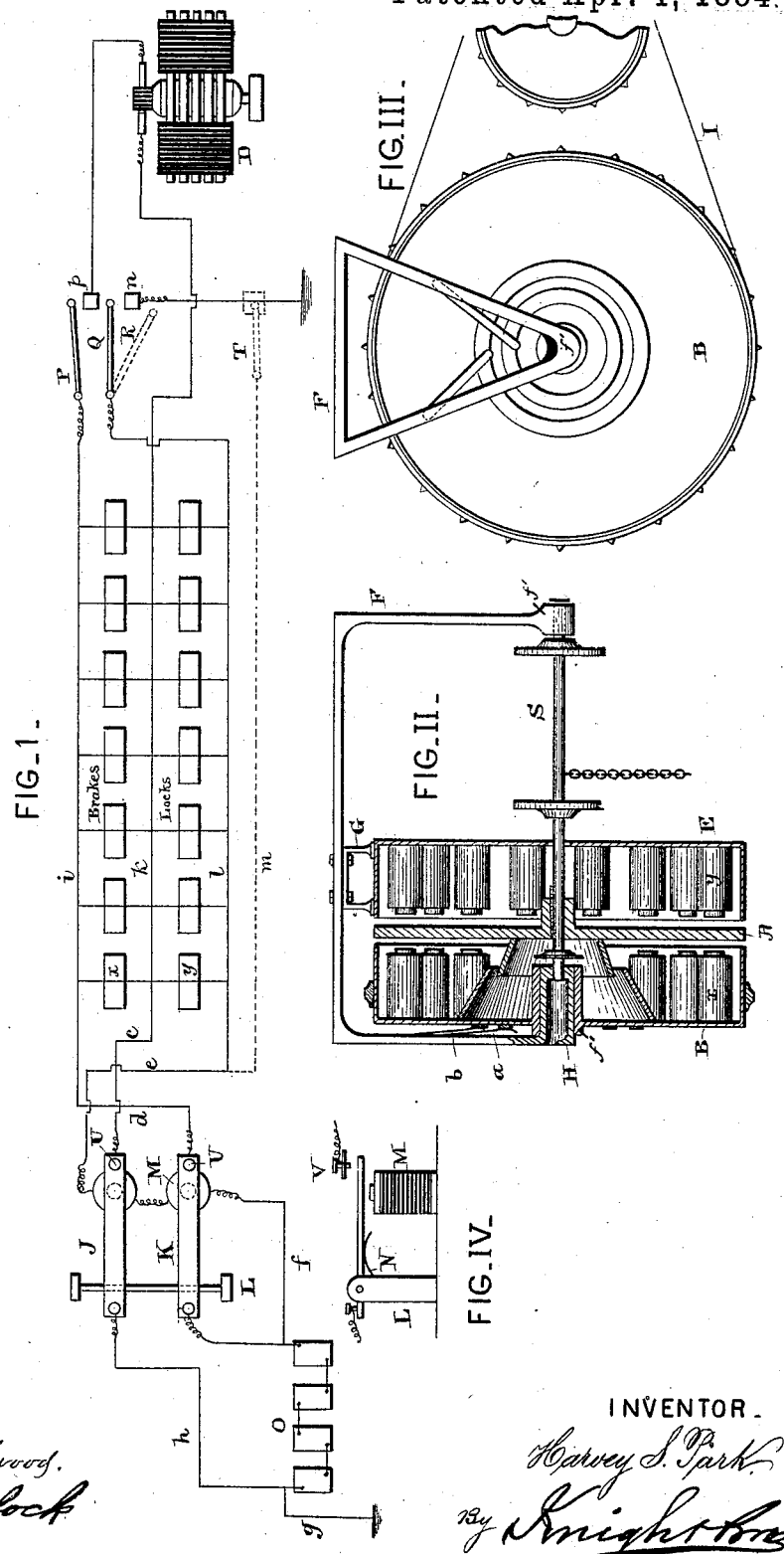

HARVEY S. PARK, OF HENDERSON, KENTUCKY.

ELECTRO-MAGNETIC CAR-BRAKE.

SPECIFICATION forming part of Letters Patent No. 296,212, dated April 1, 1884.

Application filed November 22, 1883. (No model.)

*To all whom it may concern:*

Be it known that I, HARVEY S. PARK, a citizen of the United States, residing at Henderson, in the county of Henderson and State of Kentucky, have invented a new and useful Improvement in Electric Brakes, of which the following is a specification, reference being had to the accompanying drawings, in which—

Figure 1 is a diagram of the circuits. Fig. 2 is a front view, partly in section, of the actuating electro-magnets and their surroundings. Fig. 3 is a side view of the same, and Fig. 4 shows the controlling electro-magnet.

My present invention relates to that class of brakes known as "severance" brakes, which are adapted to act automatically upon the severance of a line of connections running through the entire train, and is an improvement on my previous one, wherein there were combined separate devices for braking and for locking and holding the brakes when they are once drawn up; and it consists in specific devices for braking, and in an arrangement of electric circuits therefor.

In Fig. 2, S is a shaft, whose ends are journaled in boxes $f'$ in the lower extremities of the hangers or frame F. On this shaft is fastened the brake-chain C, which is wound up by the rotation of the shaft. An iron disk, A, is connected to the shaft by a feather, which causes the disk and shaft to rotate together, and yet allows a longitudinal motion of the former on the latter. On either side of A are two hollow cylinders, B and E, having within them, respectively, the two circular series of magnets $x$ and $y$. E is held rigidly to the frame by brace G, while B and its contained magnets is free to rotate on hollow journal H, fixed to frame F. It is driven from the car-axle by sprocket-chain I, and the current is conveyed to the moving magnets by sliding contacts $a$ and $b$. If, now, the magnets $x$ be energized, the disk A will be drawn up against their poles, and the magnets being rotated from the car-axle, the disk will turn with them, thereby rotating shaft S and winding up brake-chain C thereon. If, when the brakes have been drawn up sufficiently, the current be shifted from magnets $x$ to magnets $y$, disk A will be drawn up to their poles, and as they are fixed in position, the shaft S and the chain C are held firmly with the brakes locked.

I provide arrangements in this invention whereby the current of a dynamo on the locomotive may be sent through either the braking or the locking magnets; and I further provide an accumulator or secondary battery, preferably placed on the last car of the train, which will do the duty of the dynamo at the will of the engineer, or automatically, in case of breakage of the train, and apply the brakes.

In Fig. 1, D is the dynamo. One line, $k$, from the dynamo extends along the train between the locking-magnets $y$ and braking-magnets $x$. The other line extends to contact-plate $p$, where it may be placed in connection with lines $i$ or $l$ by switches P or Q. When it is connected to $i$ by switch P, the brake-magnets $x$ are in circuit in multiple arc; but when the switch Q is turned to $p$, the locking-magnets $y$ are in circuit. These switches are under the control of the engineer, who can brake and lock at will. The lines $k$ and $i$ terminate in contact-points U and V, respectively, whence they connect through armatures J and K of magnet M with secondary battery O, and when this connection is uninterrupted and the brake-magnets are in circuit, the battery O will be in multiple arc with them and be charged by the dynamo. It may, however, be charged in any other way, as by a stationary dynamo, before it is placed on the train. If, when the battery is charged and the connection at U and V is still uninterrupted, the dynamo-circuit should be broken, then the battery will discharge through the brake-magnets and tend to stop the train. This connection at U V is under the control of the engineer, however, by means of magnet M, of very high resistance in a ground branch, one pole of the battery being put to ground at $g$ through the wheel and track, while from the other pole a line, $f$, extends to magnet M, and from M a line, $e$, extends to line $l$, or to an independent line indicated by dotted line $m$. Line $l$ or $m$ extends the length of the train, and is governed by a switch at the forward end. When this circuit is closed, the magnet M draws down its armatures J and K, which are otherwise held up by springs N, and thereby breaks their contact with points U and V. This is the normal condition; but when the circuit through M is broken, either at the will of the engineer, by his moving switch R or T, or by the breakage of the train at any point, then M releases its armature, closing the circuit to the brake-magnets at U V. This actuates the brakes and tends to bring the train to a standstill.

Having thus described my invention, the following is what I claim as new therein and desire to secure by Letters Patent:

1. The combination of a system of electric brakes on a train, a dynamo-electric generator having an operative connection with the brake-magnets, and a supplementary secondary battery, which has also an operative connection with the brake-magnets.

2. The combination of a system of electric brakes on a train, a dynamo-electric generator having an operative connection with the brake-magnets, and a supplementary secondary battery, which has also an operative connection with the brake-magnets, and an electro-magnetic device controlling the battery-circuit.

3. The combination of a system of electric brakes on a train, a secondary battery operating the same, and an electro-magnetic device controlling the battery-circuit, and having its own circuit extending the length of the train.

4. An electro-magnetic severance braking system consisting of a secondary battery having connection in two circuits of relatively high and low resistance, the high-resistance circuit containing means, when traversed by a current of electricity, for breaking the circuit of low resistance, and braking-magnets in such low-resistance circuit, having means for winding up the brake-chain.

5. In an electro-magnetic braking system, the combination of a generator placed upon one end of the train, a secondary battery upon the other end, electro-magnets on the cars for effecting the application of the brakes, outgoing and return conductors, and an additional conductor of relatively high resistance for operating a make and break in the main circuit, substantially as set forth.

6. The combination, with the frame or sleepers of a car, of hangers F, boxes $f'$, and an electro-magnetic clutch apparatus supported thereby, substantially as set forth.

HARVEY S. PARK.

Witnesses:
LOUIS OBUDERFER,
JOS. F. JOHNSON.